(12) United States Patent
Zhang et al.

(10) Patent No.: US 9,639,806 B2
(45) Date of Patent: May 2, 2017

(54) SYSTEM AND METHOD FOR PREDICTING ICONICITY OF AN IMAGE

(71) Applicant: Xerox Corporation, Norwalk, CT (US)

(72) Inventors: Yangmuzi Zhang, College Park, MD (US); Diane Larlus-Larrondo, La Tronche (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 481 days.

(21) Appl. No.: 14/253,326

(22) Filed: Apr. 15, 2014

(65) Prior Publication Data
US 2015/0294191 A1     Oct. 15, 2015

(51) Int. Cl.
| | | |
|---|---|---|
| G06K 9/62 | (2006.01) | |
| G06N 99/00 | (2010.01) | |
| G06K 9/00 | (2006.01) | |
| G06N 7/00 | (2006.01) | |

(52) U.S. Cl.
CPC ....... G06N 99/005 (2013.01); G06K 9/00751 (2013.01); G06K 9/6272 (2013.01); G06K 9/6218 (2013.01); G06N 7/005 (2013.01)

(58) Field of Classification Search
CPC .... G06K 9/6254; G06K 9/6256; G06K 9/627; G06K 9/469; G06F 17/3053
See application file for complete search history.

(56) References Cited

U.S. PATENT DOCUMENTS

| | | | | |
|---|---|---|---|---|
| 7,587,064 | B2* | 9/2009 | Owechko | G06K 9/6254 |
| | | | | 382/103 |
| 8,352,465 | B1 | 1/2013 | Jing et al. | |
| 8,542,950 | B2* | 9/2013 | Berg | G06F 17/30247 |
| | | | | 382/220 |
| 8,566,331 | B1 | 10/2013 | Covell et al. | |
| 2003/0021481 | A1 | 1/2003 | Kasutani | |
| 2007/0005356 | A1 | 1/2007 | Perronnin | |
| 2007/0258648 | A1 | 11/2007 | Perronnin | |
| 2008/0069456 | A1 | 3/2008 | Perronnin | |
| 2008/0240572 | A1 | 10/2008 | Hoshi | |

(Continued)

OTHER PUBLICATIONS

U.S. Appl. No. 14/184,936, filed Feb. 20, 2014, Larlus-Larrondo, et al.

(Continued)

*Primary Examiner* — Gregory M Desire
(74) *Attorney, Agent, or Firm* — Fay Sharpe LLP (57) ABSTRACT

A system and method for evaluating iconicity of an image are provided. In the method, at least one test image is received, each test image including an object in a selected class. Properties related to iconicity are computed for each test image. The properties may include one or more of: a) a direct measure of iconicity, which is computed with a direct iconicity prediction model which has been learned on a set of training images, each training image labeled with an iconicity score; b) one or more class-independent properties; and c) one or more class-dependent properties. A measure of iconicity of each of the test images is computed, based on the computed properties. By combining a set of complementary properties, an iconicity measure which shows good agreement with human evaluations of iconicity can be obtained.

16 Claims, 5 Drawing Sheets

(56) References Cited

U.S. PATENT DOCUMENTS

| | | |
|---|---|---|
| 2008/0317358 A1 | 12/2008 | Bressan et al. |
| 2009/0132441 A1* | 5/2009 | Muller .................. H04N 7/163 706/11 |
| 2009/0144033 A1 | 6/2009 | Liu et al. |
| 2009/0208118 A1 | 8/2009 | Csurka |
| 2010/0040285 A1 | 2/2010 | Csurka et al. |
| 2010/0082615 A1 | 4/2010 | Clinchant et al. |
| 2010/0092084 A1 | 4/2010 | Perronnin et al. |
| 2010/0098343 A1 | 4/2010 | Perronnin et al. |
| 2010/0189354 A1 | 7/2010 | de Campos et al. |
| 2010/0191743 A1 | 7/2010 | Perronnin et al. |
| 2010/0226564 A1 | 9/2010 | Marchesotti et al. |
| 2010/0303342 A1* | 12/2010 | Berg ................. G06F 17/30247 382/155 |
| 2010/0318477 A1 | 12/2010 | Perronnin et al. |
| 2011/0026831 A1 | 2/2011 | Perronnin et al. |
| 2011/0040711 A1 | 2/2011 | Perronnin et al. |
| 2011/0052063 A1 | 3/2011 | McAuley et al. |
| 2011/0072012 A1 | 3/2011 | Ah-Pine et al. |
| 2011/0091105 A1 | 4/2011 | Perronnin |
| 2011/0129159 A1 | 6/2011 | Cifarelli |
| 2011/0137898 A1 | 6/2011 | Gordo et al. |
| 2011/0184950 A1 | 7/2011 | Skaff et al. |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2012/0158739 A1 | 6/2012 | Ah-Pine et al. |
| 2012/0163715 A1 | 6/2012 | Murray et al. |
| 2013/0064444 A1 | 3/2013 | Gordo et al. |
| 2013/0159292 A1 | 6/2013 | Larlus et al. |
| 2013/0290222 A1 | 10/2013 | Gordo et al. |
| 2015/0294191 A1* | 10/2015 | Zhang .................. G06K 9/6256 382/160 |

OTHER PUBLICATIONS

Berg, et al., "Finding iconic images," Proc. 2nd Internet Vision Workshop at CVPR, pp. 1-8 (2009).
Berg, et al., "Automatic ranking of iconic images," Technical report, U.C. Berkeley, pp. 1-13, (2007).
Blanz, et al., "What object attributes determine canonical views?" Technical report No. 42, MPI, pp. 1-18 (1996).
Branson, et al., "Visual recognition with humans in the loop," ECCV, pp. 438-451 (2010).
Bülthoff, et al., "Psychophysical support for a two-dimensional view interpolation theory of object recognition," Proc. Nat'l Acad. Science (PNAS), pp. 60-64 (1992).
Clinchant, et al., "XRCE's participation to ImagEval," ImagEval Workshop at CVIR, pp. 1-8 (2007).
Csurka, et al., "Visual categorization with bags of keypoints" ECCV SLCV workshop, pp. 1-16 (2004).
Denton, et al., "Selecting canonical views for view-based 3-D object recognition," ICPR, vol. 2, pp. 273-276 (2004).
Ehinger, et al., "Canonical views of scenes depend on the shape of the space," Proc. 33rd Annual Conf. of the Cognitive Science Society, pp. 2114-2119 (2011).
Douze, et al., "Evaluation of GIST descriptors for web-scale image search," Proc. ACM Intern'l Conf. on Image and Video Retrieval (CIVR '09) Article No. 19, pp. 1-8 (2009).
Ehinger, et al., "Estimating scene typicality from human ratings and image features," CogSci, pp. 1-6 (2011).
Farhadi, et al., "Describing objects by their attributes," CVPR pp. 1778-1785 (2009).
Felzenszwalb, et al., "Object Detection with Discriminatively Trained Part-Based Models," IEEE Trans. on PAMI, 32(9): pp. 1627-1645 (2010).
Ferrari, et al., "Learning visual attributes," NIPS, pp. 1-8 (2007).
Garg, et al., "Iconizer: A framework to identify and create effective representations for visual information encoding," Smart Graphics, Lecture Notes in Computer Science, vol. 6815, pp. 78-90 (2011).
Girshick, et al., "Discriminatively trained deformable part models, release 5," pp. 1-2 (2012). downloaded at http://people.cs.uchicago.edu/ rbg/latent-release5/ on Feb. 21, 2014.
Isola, et al., "What Makes an image memorable?" IEEE Conf. on Computer Vision and Pattern Recognition, pp. 145-152 (2011).
Isola, et al., "What Makes a photograph memorable?" IEEE Trans Pattern Anal Mach Intell., pp. 1-14 (2013).
Jégou, et al., "Aggregating local image descriptors into compact codes" IEEE Trans. Pattern Anal. Mach. Intell. (TPAMI), 34(9), pp. 3304-3311 (2012).
Jing, et al., "Canonical image selection from the web," Proc. 6th ACM Intern'l Conf. on Image and video retrieval (CIVR), pp. 280-287(2007).
Joachims, et al., "Optimizing search engines using clickthrough data," SIGKDD, pp. 133-142 (2002).
Ke, et al., The design of high-level features for photo quality assessment. CVPR, pp. 419-426 (2006).
Lampert, et al., "Learning to detect unseen object classes by between-class attribute transfer," CVPR, pp. 951-958 (2009).
Lazebnik, et al., "Beyond bags of features: Spatial pyramid matching for recognizing natural scene categories," CVPR, pp. 2169-2178 (2006).
Li, et al., "Modeling and recognition of landmark image collections using iconic scene graphs," ECCV (95) pp. 213-239 (2008).
Lowe, et al., "Distinctive image features from scale-invariant keypoints," IJCV, vol. 60, pp. 91-110 (2004).
Mezuman, et al., "Learning about canonical views from internet image collections," NIPS, pp. 728-736 (2012).
Murray, et al., "Ava: A large-scale database for aesthetic visual analysis," CVPR, pp. 2408-2415 (2012).
Olivia, et al., "Modeling the shape of the scene: A holistic representation of the spatial envelope," IJCV, vol. 42(3) pp. 145-175 (2001).
Perronnin, et al. "Improving the Fisher Kernel for large-scale image classification" CVPR, pp. 143-156 (2010).
Raguram, et al., "Computing iconic summaries of general visual concepts," Internet Vision Workshop at CVPR, pp. 1-8 (2009).
Raguram, et al., "Modeling and recognition of landmark image collections using iconic scene graphs," IJCV, pp. 213-239 (2011).
Sánchez, et al. "Image classification with the Fisher Vector: theory and practice" IJCV, pp. 222-245 (2013).
Simon, et al al., "Scene summarization for online image collections," ICCV, pp. 1-8 (2007).
Wah, et al. The Caltech-UCSD Birds-200-2011 Dataset, Technical Report CNS-TR-2011-001, Caltech, pp. 1-8 (2011).
Wah, et al., "Multiclass recognition and part localization with humans in the loop," ICCV, pp. 2524-2531 (2011).
Weinshall, et al., "Canonical views, or the stability and likelihood of images of 3D objects," Image Understanding Workshop, pp. 967-971 (1994).
Weyand, et al., "Discovering favorite views of popular places with iconoid shift," ICCV, pp. 1132-1139 (2011).

* cited by examiner

SYSTEM AND METHOD FOR PREDICTING ICONICITY OF AN IMAGE

BACKGROUND

The exemplary embodiment relates to visual classification and finds particular application in connection with a system and method for predicting the iconicity of an image and for selection of class-related iconic images.

Humans often associate a concept, e.g., an object, a scene, a place or a sentiment, with a normalized visual representation (referred to as canonical representation). This observation led to the notion of a canonical or iconic image. An image is said to be canonical/iconic if it is a good representative for a given concept. Several characteristics can be viewed as indications of "representativeness." For example, an image may be considered iconic if it is: 1) the best-liked image of the concept, 2) the picture a person would see when imagining the concept, 3) the photo a person would take of the concept, or 4) the image that facilitates recognition (see, Blanz, et al., "What object attributes determine canonical views?" Technical report No. 42, MPI (1996), hereinafter "Blanz 1996"). A similar definition is that an iconic image can be considered as an image that one would show to a person, for instance to a child, to teach a concept (see, Berg, et al., "Finding iconic images," Proc. 2nd Internet Vision Workshop at CVPR (2009), hereinafter, "Berg 2009"), and is used herein.

There has been considerable interest in being able to predict automatically whether an image is iconic or not. See, for example, Berg 2009; Berg, et al., "Automatic ranking of iconic images," Technical report, U. C. Berkeley (2007), hereinafter, "Berg 2007"; Jing, et al., "Canonical image selection from the web," CIVR, pp. 280-287 (2007), hereinafter, "Jing 2007"; Li, et al., "Modeling and recognition of landmark image collections using iconic scene graphs," ECCV 95: 213-239 (2008), hereinafter "Li 2008"; Mezuman, et al., "Learning about canonical views from internet image collections," NIPS, pp. 728-736 (2012); Raguram, et al., "Computing iconic summaries of general visual concepts," Internet Vision Workshop at CVPR (2009), hereinafter, "Raguram 2009"; and Weyand, et al., "Discovering favorite views of popular places with iconoid shift," ICCV, pp. 1132-1139 (2011), hereinafter, "Weyand 2011".

In general, people may consider images to be iconic when the image is a view of a relatively large object (relative to the size of an image), which is close to the center of the image, on a relatively clean or uncluttered background, where there is substantial contrast between the depicted object and the background, the object is observed from a suitable viewpoint, and where the object is clearly separated from the background. However, the relative importance of each of these aspects to human perception of iconicity has been difficult to quantify. Also, there is no guarantee that this list of properties is exhaustive.

Much of the work done on iconic images has focused on one of two properties: the viewpoint and the ability to summarize a collection. In the case of viewpoint, the image set typically corresponds to different photos of the same object instance, typically viewed under ideal conditions (e.g., a synthesized object with no background). Several studies have verified the existence of iconic viewpoints for three-dimensional objects (see, Blanz 1996; Bulthoff, et al., "Psychophysical support for a two-dimensional view interpolation theory of object recognition," PNAS, pp. 60-64 (1992)) as well as for scenes (see, Ehinger, et al., "Canonical views of scenes depend on the shape of the space," Proc. 33rd Annual Conf. of the Cognitive Science Society, pp. 2114-2119 (2011)). Several works have also considered the problem of computing the best viewpoint from a 3D model (Weinshall, et al., "Canonical views, or the stability and likelihood of images of 3D objects," Image Understanding Workshop, pp. 967-971 (1994)) or a set of 2D shapes (see, Denton, et al., "Selecting canonical views for view-based 3-D object recognition," ICPR, vol. 2, pp. 273-276 (2004), hereinafter, "Denton 2004").

In the case of summarization, several studies have considered the case where the image set is a large collection of noisy images collected from the Internet, for example, by querying a search engine such as Google Image Search or a photo-sharing website such as Flickr. In this approach, an iconic image is considered to be an image that best summarizes the data and the problem of finding iconic images is generally treated as one of finding clusters (see, Jing 2007; Raguram 2009; Li 2008) or modes (see, Mezuman, et al., "Learning about canonical views from internet image collections," NIPS, pp. 728-736 (2012); Weyand, et al., "Discovering favorite views of popular places With iconoid shift," ICCV (2011)) in the image feature space. In most of these works, the results are evaluated either qualitatively through a manual inspection of the found iconic images (Mezuman 2012; Li 2008; Weyand 2011) or simply by measuring whether the found iconic images are relevant or not with respect to the concept (Raguram 2009). However, a relevant image may not necessarily be iconic.

Beyond viewpoint and summarization, Berg and Forsyth proposed a nearest-neighbor classifier to predict image iconicity and used figure vs. background segmentation to focus on the area of interest in the image (see, Berg 2007). However, their study does not provide any detailed analysis as to what makes an image iconic. In Berg 2009, possible properties that could correlate with iconicity, such as the object size and position are proposed. However, in their experimental study, the users were explicitly instructed to take these criteria into account, which biased the results somewhat favorably toward these properties. Raguram and Lazebnik proposed to leverage an aesthetic measure but only a qualitative evaluation of the impact of the aesthetic factor was conducted (Raguram 2009).

There remains a need for a system and method which identify properties which provide good indicators of iconicity.

INCORPORATION BY REFERENCE

The following references, the disclosures of which are incorporated herein by reference in their entireties, are mentioned:

The following references, the disclosures of which are incorporated herein by reference in their entireties, are mentioned:

U.S. application Ser. No. 14/184,936, filed Feb. 20, 2014, entitled GENERATING GOLD QUESTIONS FOR CROWDSOURCING, by Diane Larlus-Larrondo, et al.

U.S. Pat. No. 8,352,465, issued Jan. 8, 2013, entitled GROUPING OF IMAGE SEARCH RESULTS, by Yushi Jing, et al.

U.S. Pat. No. 8,566,331 issued Oct. 22, 2013, entitled ORDERING IMAGE SEARCH RESULTS, by Michele Covell, et al.

U.S. Pub. No. 20100303342, published Dec. 2, 2010, entitled FINDING ICONIC IMAGES, by Tamara L. Berg, et al.

U.S. Pub. No. 20110129159, published Jun. 2, 2011, entitled CONTENT BASED IMAGE SELECTION FOR AUTOMATIC PHOTO ALBUM GENERATION, by Claudio Cifarelli.

BRIEF DESCRIPTION

In accordance with one aspect of the exemplary embodiment, a method for evaluating iconicity of an image includes receiving at least one test image which includes an object in a selected class. For each of the at least one test images, the method includes computing a plurality of properties related to iconicity. The properties are selected from a) a direct measure of iconicity computed with a direct iconicity prediction model which has been learned on a set of training images, each training image labeled with an iconicity score, b) at least one class-independent property, and c) at least one class-dependent property. A measure of iconicity of the test image is computed, based on the plurality of computed properties.

At least one of the computing of the plurality of properties and the computing the measure of iconicity of the image may be performed with a processor.

In accordance with another aspect of the exemplary embodiment, a system for evaluating iconicity of an image includes memory which stores components for computing a plurality of properties of an input test image, the properties being selected from a direct measure of iconicity computed with a direct iconicity prediction model which has been learned on a set of training images, each training image labeled with an iconicity score, at least one class-independent property, and at least one class-dependent property, given a selected class for the image. An aggregating component computes a measure of iconicity of the test image based on the plurality of computed properties. A processor implements the components for computing the plurality of properties and the aggregating component.

In accordance with another aspect of the exemplary embodiment, a method for generating a user interface includes, for a selected class, collecting a set of test images, each of the test images including an object in the selected class. For each of the test images in the set, computing a descriptor for the test image based on features extracted from patches of the test image. A measure of iconicity is computed for each of the test images in the set of images based on the descriptor for the test image and a subset of the set of test images is displayed in the user interface, the subset being selected based on the computed iconicity measures.

The computing of the descriptor and computing of the iconicity measure may be performed with a processor.

DETAILED DESCRIPTION

Aspects of the exemplary embodiment relate to a system and method for identifying iconic images and/or for predicting the iconicity of an image. Several properties are identified which are useful as indicators for predicting iconicity automatically. These properties may be used singly or in combination. The exemplary method includes identifying a set of properties which are complementary and combining them to provide a measure of iconicity.

As noted above, an iconic image is suitably an image that one would show to a person, for instance to a child, to teach a concept. However, given that a limited set of images may be available from which to select an iconic image, iconicity is not considered an absolute property but a relative one: the most iconic image of a set depends on the other images in the set. The iconicity scores herein are thus in general, relative values.

The iconic images identified in the exemplary method are predicted to be better than others in the group (ideally the best image) to show to a person, e.g., for teaching them to recognize the particular class.

The exemplary iconicity evaluation system and method disclosed herein may have many applications, including choosing the best illustration for a concept in the graphics domain, re-ranking the top-retrieved results for a web image search, summarizing photographic image collections, such as holiday pictures, and providing images to facilitate a recognition task in a semiautomatic visual classification system, e.g., if the textual description is not enough, for example, in a crowdsourcing application. An application of the iconicity predictions to selecting the visual content of a user interface in a crowdsourcing application is given by way of example.

The term "class" is used to refer to a group of images that have some visible object in common, such as birds, animals, people, cars, buildings, landscape scenes, or more fine-grained classes, such as herons, or a particular species. The class, however, need not have a formal definition. The method aims to identify an iconic image for the class of interest (bird species in the examples below) or to rank at least some of the images according to their level of iconicity.

The iconicity-related properties discussed herein are grouped into two categories: class-independent and class-dependent. A direct iconicity predictor is also contemplated, which is also class-independent. Class-dependent properties make use of training data for the selected class. Class-independent properties are properties which are largely independent of the class of interest, such as: geometric properties, e.g., object size in relation to the size of the image, location of the object in relation to the image; occlusion of the object; aesthetic properties; and memorability. Class-dependent properties include distance to cluster center, object classifier score, and attribute classifier score. Direct iconicity prediction with a trained classifier, which can be considered class-dependent, is also considered. These properties and their use as iconicity indicators, either singly or in combination, is discussed below. In general, a combination of properties such as a combination of at least one-class-dependent property and at least one class-independent property is found to be useful in predicting iconicity, when compared to ground truth data obtained for training images from a set of human annotators.

While it is likely that viewpoint plays a role in finding a good representative for a class, at least in the case of some classes, it is not generally practical to compute a viewpoint in the case of flexible objects, such as animals and birds, although it could be used in the case of more rigid objects, such as vehicle types.

Figure 1:
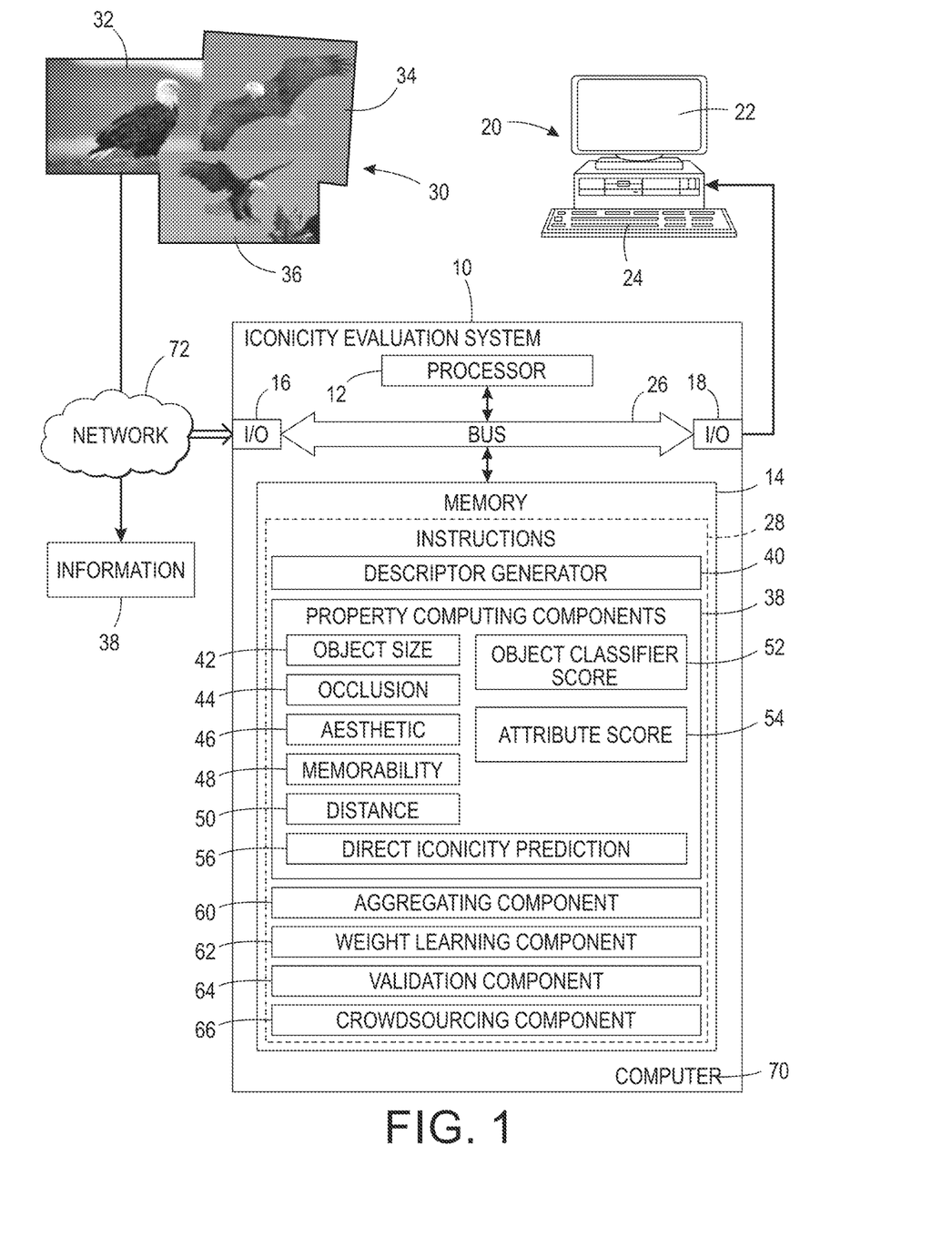
FIG. 1 is a functional block diagram of a system for identifying iconic images in accordance with one aspect of the exemplary embodiment.

With reference to FIG. 1, a computer-implemented iconicity evaluation system 10 is shown. The system is capable of implementing at least part of the method described below with reference to FIGS. 2 and/or 3. The system 10 includes a processor 12, which controls the overall operation of the computer system 10 by execution of processing instructions which are stored in memory 14 connected to the processor 12. Computer system 10 also includes a network interface 16 and optionally a local input/output interface 18. The local I/O interface 18 may communicate with a user interface device 20 which may include one or more of a display device 22, such as an LCD screen or computer monitor, for displaying information to users, and a user input device 24, such as one or more of a keyboard, touch or writable screen, and/or a cursor control device, such as mouse, trackball, or the like, for inputting text and for communicating user input information and command selections to the processor 12. The various components of the computer 10 may be all connected by a bus 26. The processor 12 executes instructions 28, stored in memory 14 for performing the method outlined in FIGS. 2 and/or 3.

The system receives as input a set 30 of photographic images 32, 34, 36, etc., which are referred to herein as test images. While three photographic images are illustrated in FIG. 1 by way of example, there may be many more, such as from 10 to 100 test images or more. In general, all the test images in the set 30 include an object which is in a selected class of interest. Classes may include, for example, bird classes, where the object is a type of bird, vehicle classes where the object is a type of vehicle, etc. The images may be input into the system in any suitable form, such as pdf, jpeg, or the like and may be converted to another form for processing. Each image 32, 34, 36 generally includes an array of pixels, each pixel being associated with color information. The color information may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The word "color" is used to refer to any aspect of color which may be specified, including, but not limited to, absolute color values, such as hue, chroma, and lightness, and relative color values, such as differences in hue, chroma, and lightness.

The system 10 is configured for computing a measure of iconicity for each of the test images in the set 30 and outputting information 38 based thereon. Depending on the application, the information 38 that is output by the system 10 may include the measure of iconicity for one or more of the images in the set, a most iconic image (or subset of most iconic images) from the set, an analysis of the properties which contributed to the iconicity determination, and/or other information. A human reviewer may review the information 38 output by the system on the user interface device 20.

The exemplary instructions 28 include a descriptor generator 40 for generating a multidimensional visual representation (referred to herein as an image descriptor) of each test image based on features extracted from the image. The instructions also include property computing components 42, 44, 46, 48, 50, 52, 54, etc. for computing properties of the image that relate to iconicity which are used in combination to compute the measure of iconicity. By way of example, the following components are illustrated, without intending to be limiting: one or more class-independent property computing components, such as a geometric property (e.g., object size) computing component 42, an occlusion computing component 44, one or more components 46 for computing aesthetic properties, and a memorability computing component 48, and one or more class-dependent property computing components, such as a distance (to cluster center) computing component 50, an object scoring component 52 for computing an object classifier score for the selected class, and an attribute scoring component 54 for computing an attribute score for the selected class. A direct iconicity prediction component 56 may be used alone or in combination with one or more of the other property computing components.

An aggregating component 60 aggregates the scores output by the property computing components 42, 44, 46, 48, 50, 52, 54, etc. and direct iconicity prediction component 56 to generate an iconicity score for an image. The aggregation may be a weighted average of the optionally normalized scores of the property computing components. In this embodiment, a weight learning component 62 learns the weights used in the aggregation using labeled training images for the class, where the labels are based on manually selected iconicity scores. Optionally, a validation component 64 outputs one or more of the most iconic images (based on the scores) to the user interface device 20 for validation by a reviewer. In one specific embodiment, a crowdsourcing component 66 uses the iconicity scores for the test images to select representative images for a crowdsourcing task and/or to select images for gold questions that are used to evaluate an annotator's performance in the crowdsourcing task.

As used herein, the term "score" is intended to encompass numerical scores, rankings, and similar measures.

The computer system 10 may be embodied in one or more computing devices 70, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 14 may represent any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory.

The network interface 16 allows the computer to communicate with other devices via a computer network 72, such as a local area network (LAN) or wide area network (WAN), or the Internet, and may comprise a modulator/demodulator (MODEM) a router, a cable, and and/or Ethernet port.

The digital processor 12 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
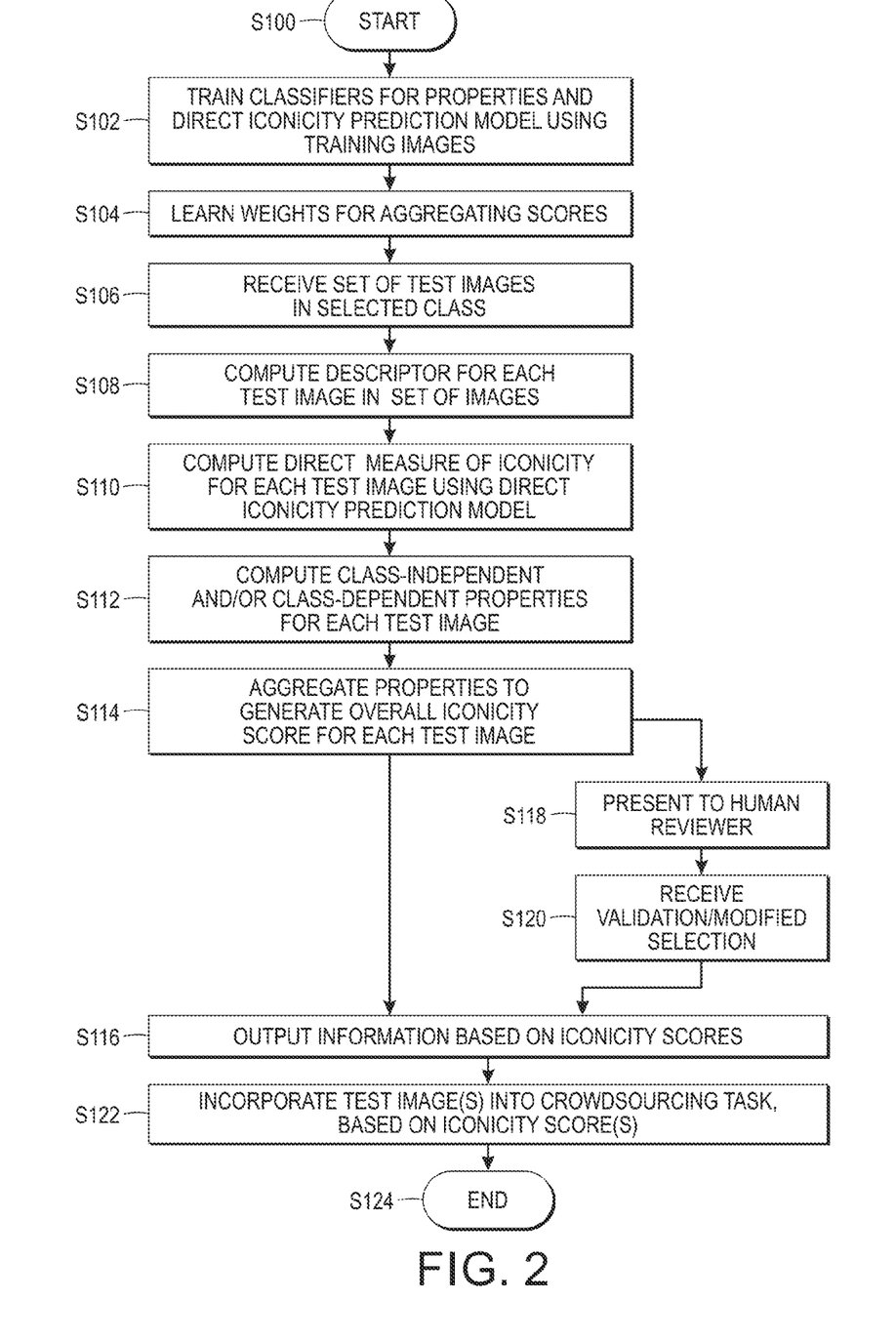
FIG. 2 is a flow chart illustrating a method for identifying iconic images in accordance with another aspect of the exemplary embodiment.
Figure 3:
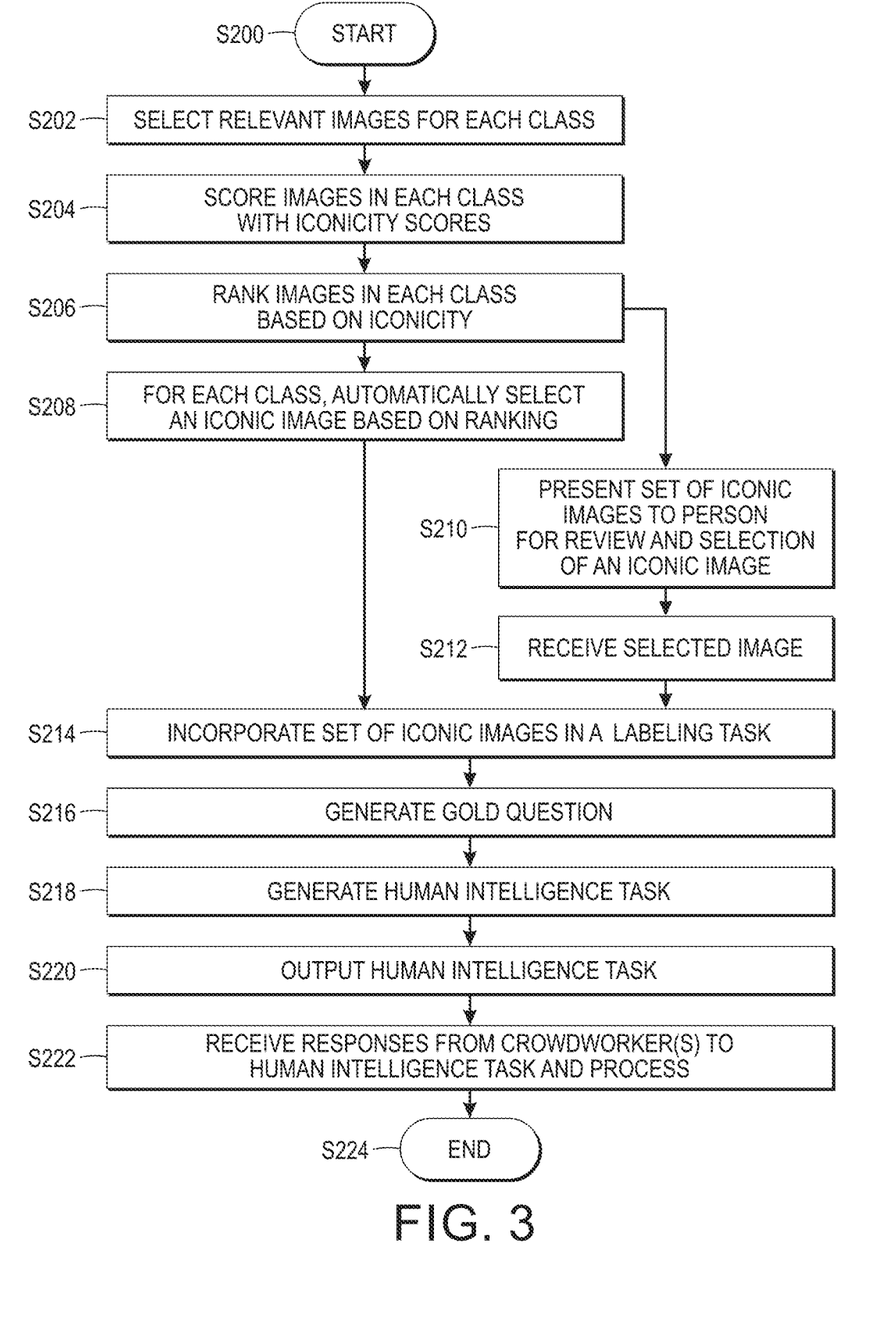
FIG. 3 is a flow chart illustrating a method for using iconicity scores in a crowdsourcing application in accordance with one aspect of the exemplary embodiment.

With reference now to FIG. 2, a method for predicting iconicity of one or more images is shown. The method begins at S100.

At S102, classifiers to be used by the system components 44, 46, 52, 54, 56 may be trained by supervised learning on a labeled training set, if not already available, the labels being related to the property. This may include training an object classifier for the object scoring component 52, an attribute classifier for the attribute scoring component 54, and/or a direct iconicity classifier model for the direct iconicity predictor 56.

At S104, weights may be learned by the weight learning component 62 to be used for aggregating the scores output by the different prediction components 42, 44, 46, 48, 50, 52, 54, 56, if not already performed.

At S106, a set 30 of one or more test images for the selected class is received and stored in memory 14. If there is more than one class being considered, the name of the selected class may also be received. Alternatively or additionally, an automated image labeling process may be implemented to recognize the class of the object. This allows the class-dependent property features to be computed.

At S108, a multi-dimensional descriptor of each test image in the set 30 may be computed based on features extracted from the image, by the descriptor generator 40.

At S110, for each image in the set 30, a direct measure of iconicity may be computed by the direct iconicity predictor 56, based on the respective descriptor.

At S112, one or more class-independent properties and/or one or more class-dependent properties may be computed for each of the images in the set 30, using components 42, 44, 46, 48, 50, 52, 54.

At S114, a measure of iconicity may be computed, by the aggregating component 60, for each of the test images by aggregating one or more of the class-independent properties, the class-dependent properties, and/or direct iconicity prediction.

At S116, information 38 is output based on the computed iconicity measures. The output information may include one or more of: a subset of the most iconic image(s), a ranking of the images based on their iconicity measures, a set of images which meet a predefined threshold iconicity measure (or range of measures), or other information based thereon.

In some embodiments, at S118, a human reviewer is presented with the information 38, via the user interface device 20, for validation before it is used or output from the system. The reviewer may be provided with a representation which indicates why a particular image was considered iconic or received a certain iconicity measure, for example, by displaying the properties which contributed most to the result, as illustrated, for example, in the user interface 74 shown in FIG. 4, which may be displayed on the display device 22. If at S120, the user validates the information, the information may be output/used, otherwise, the reviewer may modify the information, e.g., select an alternative image from the set.

In some embodiments, at S122, one of the images in the set 30 is automatically incorporated in a crowdsourcing task, by the crowdsourcing component 66.

The method ends at S124.

Further details of the system and method will now be described.

While properties discussed herein may be used singly to predict iconicity, in the exemplary embodiment, a combination of properties is used and the results aggregated. In particular, a combination of class-dependent and class-independent properties may be employed. This approach also allows an understanding of what makes an image iconic. This enables providing feedback to a user and can guide the process of selecting iconic images. This feedback may be particularly useful in a semi-automatic method for designing user interfaces.

Image Descriptor (S108)

For several of the following properties, an image descriptor or "signature" is used to represent the test image. The descriptor can be considered generic as it is computed in the same manner for all the test images.

The image descriptor generated by the descriptor generator 40 for each image in the set 30 can be any suitable high level statistical representation of the image, such as a multidimensional vector generated based on features extracted from the image. Fisher Vector (FV) representations and Bag-of-Visual-Word (BOV) representations are exemplary of suitable high-level statistical descriptors which can be used herein as an image descriptor. The exemplary image descriptors used for determining a given property are of a fixed dimensionality, i.e., each image descriptor has the same number of elements.

Each of the properties which make use of an image descriptor can use the same image descriptor, or the image descriptor can be tailored to the particular property.

The descriptor generator 40 may include a patch extractor, which extracts and analyzes low level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. At least 50 or 100 patches may be extracted from each image. Each patch includes a plurality of pixels and may include, for example, at least 16 or at least 64 or at least 100 pixels. In some embodiments, at least 50 low level features are extracted from each patch; however, the number of features that can be extracted is not limited to any particular number or type of features. For example, at least 1000, 10,000, or 100,000 low level features may be extracted from each patch, depending on computational capabilities.

The extracted low level features (in the form of a local descriptor, such as a vector or histogram) from each patch can be concatenated and optionally reduced in dimensionality, to form a features vector which serves as the global image descriptor. In other approaches, the local descriptors of the patches of an image are assigned to clusters. For example, a visual vocabulary is previously obtained by clustering local descriptors extracted from training images using, for example, K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object or object part (e.g., head, beak, wing, etc.), characteristic background (e.g., sky, grass, leaves, etc.), or the like. Given an image to be assigned a descriptor, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image descriptor or input to a generative model which outputs an image descriptor based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). The number of patches per image or region of an image is not limited but can be for example, at least 16 or at least 64 or at least 128. Each patch can include at least 4 or at least 16 or at least 64 pixels. In one illustrative example employing SIFT features, the features are extracted from 32×32 pixel patches on regular grids (every 16 pixels) at five scales, using 128-dimensional SIFT descriptors. Other suitable local descriptors which can be extracted include texture-based features and simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). In the exemplary embodiment, two (or more) types of low level features, such as color and gradient, are separately extracted and the descriptor of the patch or image is based on a combination (e.g., a sum or a concatenation) of two descriptors, one for each feature type.

Sub-image descriptors can be computed for two or more regions of the image and aggregated, e.g., concatenated.

In some embodiments, a Fisher vector representation is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., Sanchez, et al. "Image classification with the Fisher Vector: theory and practice," IJCV, pp. 222-245 (2013), hereinafter, "Sanchez 2013", Perronnin, et al., "Improving the Fisher Kernel for large-scale image classification," ECCV: Part IV, pp. 143-156 (2010), and Sánchez, et al., "High-dimensional signature compression for large-scale image classification," CVPR (2011), the disclosures of which are incorporated herein by reference in their entireties. The trained GMM is intended to describe the content of any image within a range of interest (for example, any color photograph of a bird if the range of interest is photographs of birds).

In other embodiments, a Bag of Visual Words (BOV) representation is used. The BOV representation an image (or region) is described by a histogram of quantized local features. (See, for example, Csurka, et al. "Visual categorization with bags of keypoints" ECCV SLCV workshop, pp. 1-16 (2004), hereinafter "Csurka 2004," and U.S. Pub. No. 20080069456). As with the FV representation, a set of the local descriptors, such as set of SIFT descriptors or color descriptors are extracted from image patches. From these, a BOV histogram is computed for one or more image regions. These region-level descriptors can then be concatenated or otherwise aggregated to form an image descriptor (e.g., one for SIFT features and one for color features). During the training phase, a visual vocabulary, i.e., a set of prototypical features, is first learned by automatically clustering a large number of local descriptors from different images, using for example, K-means. Each patch local descriptor is then assigned to a nearest cluster and a histogram of the assignments can be generated.

Another descriptor which can be used is the GIST descriptor, see Matthijs Douze, et al., "Evaluation of GIST descriptors for web-scale image search," Proc. ACM Intern'l Conf. on Image and Video Retrieval (CIVR '09) Article No. 19, pp. 1-8 (2009). The GIST descriptor is a low dimensional representation of a scene, which does not require any form of segmentation, although minimal segmentation may be used. It uses a set of perceptual dimensions (naturalness, openness, roughness, expansion, ruggedness) that represent the dominant spatial structure of a scene. However, in evaluating the method, the FV was found to be well-suited to the task of predicting iconicity.

Other methods for computing image descriptors are described in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853; 20120158739 20120163715, and 20130159292, the disclosures of which are incorporated by reference.

Properties for Evaluation of Iconicity

The following properties have been shown to capture some information about iconicity and are often complementary. These properties can be classified as class-independent, or class-dependent ones. For the latter, it is assumed that an annotated training set is available which provides example images of that category. A direct iconicity predictor is also contemplated.

A. Class-Independent Properties

1. Geometric Properties: Object Size and Location

Object size has a strong correlation with iconicity since in an iconic image, the object is often large in relation to the size of the image. This property can be determined by computing the percentage of image pixels within a bounding box (BB) of the smallest size to cover the object, denoted BB-size. The bounding box can be rectangular or other regular or irregular shape.

If the object location is not known, a detector can be used to locate the object, such as the Deformable Part Model (DPM) of Felzenszwalb, et al., "Object Detection with Discriminatively Trained Part-Based Models," IEEE Trans. on PAMI, 32(9): pp. 1627-1645 (2010).

Other layout properties of the image, such as the object position with respect to the image boundary, may also be considered (see, Berg 2009). For example, a location property denoted BB-dist2center computes the distance between the object center (BB center) and the image center, normalized by the length of the image diagonal. In the Examples below, however, the object size property was found to correlate better with human evaluations of iconicity than object position.

2. Image Aesthetic Properties

Various image aesthetics may be considered singly or in combination, such as blur, brightness, saturation and the like. One reason for using aesthetics is that visually pleasing images are generally of high quality and well-composed. Aesthetic criteria thus tend to influence choosing a representative image for teaching purposes. In one embodiment, a classifier is trained on a generic descriptor computed for each of a set of training images and respective manually-applied aesthetic scores. The Fisher Vector (FV) image descriptors described in Sanchez 2013, and others, can be used as the generic descriptor. A linear SVM classifier can then be used to predict the aesthetic quality of an image based on the input image descriptor. A suitable database for training the classifier is described in Murray, et al., "Ava: A large-scale database for aesthetic visual analysis," CVPR, pp. 2408-2415 (2012). This dataset contains about 20,000 images with manually applied binary aesthetic labels. Alternatively, a more relevant sub-set of the images can be used, such as those labeled "animal" in the case of a prediction system for birds or animals. The training images may thus be in a broader class than the selected class.

To train the classifier, a set of images in the class is used which have been manually labeled with an aesthetic score. This can be a binary label (aesthetic or not) or real valued. For this particular property, the score of the aesthetic classifier applied to the images is used.

3. Memorability Property

Memorability measures how well an image can be remembered by a person. Although the reason why images are memorable varies, this property has a correlation with iconicity.

To learn a memorability model, training images are labeled with memorability scores. These can be obtained by presenting the images in random order, more than once, to observers and asking them to identify the images that they have seen previously. A dataset for which such scores have been generated is described in Isola, et al. "What makes an image memorable?" CVPR, pp. 145-152 (2011), hereinafter, Isola 2011. This dataset contains 2,222 images labeled with memorability scores. A classifier can then be trained using the memorability scores and corresponding image descriptors. As an example, Fisher Vector (FV) image representations, as described above, are used with a linear SVM classifier to predict the memorability of an image. A binary classification model can thus be trained on the image representations of the images in the training set and their respective memorability scores. The trained classifier can then be applied to the FV representations of the set of test images to generate memorability scores.

4. Occlusion Property

This property measures the visibility of parts of the main object(s). The occlusion property correlates with iconicity in that non-occluded objects tend to be more iconic than occluded ones. Occlusion can also be considered as a proxy for viewpoint as an iconicity property.

In an exemplary embodiment, test images are annotated with the location of each of a predetermined set of object (e.g., body) parts, such as three five, ten or more object parts. As an example, for birds, the body parts may include both eyes, the forehead, the crown, the bill, the nape, the throat, the breast, the back, both wings, the belly, both legs and the tail. For each part, a determination is made as to whether it is visible in the image or not.

The occlusion score can then be simply the number (or proportion) of visible parts. If this information is not already available, a part detector can be used to annotate the images according to the parts that are visible. A suitable parts detector is disclosed, for example, in Girshick, et al., "Discriminatively trained deformable part models, release 5," pp. 1-3 (2012).

B. Class-dependent Properties

1. Object Classifier Scores

A test image that receives a high score from an object classifier trained to recognize objects in that class should represent this class well because it is supposed to contain more discriminative features. Consequently, classifier scores can be used as an iconicity property.

For this property, a classifier is trained for the class of interest using a labeled training set containing images of objects in the class as positive samples and images of objects not in the class as negative samples. In an example embodiment, a linear SVM classifier is trained for the class of interest using a labeled training set. Each training image is associated with an image descriptor, such as the Fisher Vector representation described above, and is class label, selected from a predefined set of class labels. Then the iconicity of a test image with respect to the class is measured by computing the corresponding object classifier score.

2. Attribute-based Property

Attributes are properties of an object which are shared across classes, which can be detected by a computer vision algorithm and which can be named by humans. They can be related to the object appearance (color, texture, shape, etc.), the presence of its parts, etc. Attributes as a property are related to iconicity in that an iconic image for a given class tends to display the attributes of that class. Each image can be associated with an attribute representation, which can be a vector representation of the form=$[a_1, a_2, \ldots, a_M]$, where M is the number of attributes. Each index corresponds to an attribute and is associated with a relevance value which indicates the strength of association between the attribute and the considered image. This relevance value may be binary (e.g., presence=1 or absence=0) or real-valued (e.g., if the color of a bird is turquoise but no turquoise attribute is available, then the relevance value of the attributes blue and green may each be set to 0.5). In the case of birds, for example, the attributes of each class can be identified from field guides and/or identified by an expert.

In one embodiment, a class similarity is computed. The attribute representation is compared to a predetermined class-level attribute representation of the selected class to compute a score. For example, a class-level attribute vector: $c=[c_1, c_2, \ldots, c_M]$ can be built by averaging image-level attribute vectors of a set of training (or test) images labeled with the class. Then, an image-to-class similarity (I2C) between a test image and a class C can be defined as:

$$\text{sim}=-\Sigma_{m=1}^{M}|a_m-c_m| \quad (1)$$

i.e., a function of the sum, over all attributes, of the difference between the image's score for an attribute and the corresponding score of the class level attribute. This similarity can be used as the iconicity score for the attribute property and is referred to below as I2C-Att-Orac.

The image level attribute vectors can alternatively be used as image descriptors. A classifier for each class, such as an SVM classifier, is trained on the attribute vectors of the images in a training set for that class and applied iconicity labels. Then the trained per-class classifier can be used to predict a score for each test image. This property is referred to as SVM-Att-Orac.

In another method, a Direct Attribute Prediction (DAP) model can be used to predict labels based on attribute-level information. See, C. H. Lampert, et al., "Learning to detect unseen object classes by between-class attribute transfer," CVPR pp. 951-958 (2009), for a discussion of DAP models. First, the probability of each attribute given an image, $p(a_m|x)$, is learned by training M independent attribute classifiers. The score of an image is then given by:

$$p(a|x)=\Pi_{m=1}^{M}p(a_m|x) \quad (2)$$

In another embodiment, the attribute property can be based simply on a count of attributes that are known to be associated with the object.

3. Distance to Cluster Center

According to this property, an iconic image is an image that best summarizes the set of images.

In this approach, finding iconic images involves finding clusters in the image feature space (for clustering methods, see, Lazebnik, et al. "Beyond bags of features: Spatial pyramid matching for recognizing natural scene categories" CVPR, pp. 2169-2178 (2006), hereinafter, "Lazebnik 2006", Raguram 2009, Denton 2004) or modes (see, Sanchez 2013; Jing 2007).

In the exemplary embodiment, however, a fairly restricted number of images is generally available for a given class. This is because obtaining a set of labeled images for a particular concept can be costly, particularly when the classes are fine grained, such as bird species. If only a small number of images per class is available, it is unrealistic to run a clustering algorithm. Therefore, for each class k it is assumed that a single cluster is available, whose center, e.g., its mean or medoid (closest to all others) representation is denoted $\mu_k$. Given a set of images, each containing an object in the selected class, the cluster center, e.g., mean, of the set is computed using the image descriptors of the images in the set. For any new image x (taken from the set 30 or otherwise), a similarity to the cluster center is computed based on the distance between the descriptor of x, denoted $\phi(x)$, and the mean descriptor $\mu_k$, e.g., as $(-\|\phi(x)-\mu_k\|^2)$, and this distance measure, or a normalized value thereof, is used as the image's score for class k.

As the image descriptor $\phi(x)$, a multidimensional statistical representation of the image can be used, such as one which is based on low level features extracted from multiple patches of the image. For each patch, a descriptor is generated based on the low level features. Then the descriptors extracted from the local patches are aggregated to form the image descriptor. One such descriptor is the Fisher Vector (FV), as described above. Using this descriptor, the distance property can be measured as the distance to the average or centroid FV descriptor.

C. Direct Iconicity Prediction

This property, which can also be considered a class-independent property, is directly optimized on the end task: predicting iconicity labels. For this approach, a set of training images provided in which each image is labeled with an iconicity score which is based on manual evaluations of one or more annotators. These scores may be binary or real valued. In one embodiment, real scores are converted to binary labels by assigning a label of −1 (not iconic) to all images with a score below a threshold θ and a label +1 to all images with a score at or above θ. Using these binary labels, a binary iconicity predictor is learned. As will be appreciated, a ranking classifier rather than a binary classifier can be learned on non-binary annotations.

Each training image is represented with a multidimensional descriptor which aggregates descriptors extracted from local patches. Suitable image descriptors include the bag-of-visual-words (BOV) and the Fisher vector (FV), as described above. Since the layout of an image can play a role in making it iconic, the image may be partitioned into a set of regions, and a sub-image descriptor computed per region. The sub-image descriptors are then aggregated, e.g., concatenated, to form the image descriptor. As an example, the spatial pyramid framework described in Lazebnik 2006 may be employed to generate the regions. While such image signatures have been used for category recognition or instance retrieval, they have not previously been used for iconicity prediction.

The training images may be images for the selected class or for a broader class of which the selected class is a part. In an example implementation, training images are described using a Fisher Vector (FV) representation and a SVM classifier is trained using FVs as image descriptors and the binary (or more fine-grained) iconicity labels. The trained classifier is then applied to the set 30 of unlabeled images to generate an iconicity score for each image. This method is referred to as direct iconicity prediction and it can be used singly or in combination with one or more other methods.

Combinations

In the exemplary embodiment, a combination of some or all of these properties may be used to calculate an iconicity score.

As an example, two or more of a), b), and c) are aggregated: a) being the direct iconicity prediction score b) being a score or scores for one or more class-independent properties and c) being a score or scores for one or more class-dependent properties.

In one embodiment, some or all of the following properties are all considered:

1. Class-independent properties: a. Object Size score; b. Aesthetic score, c. Memorability score; d. Occlusion score. The Aesthetic score is particularly useful.

2. Class-dependent properties: a. Distance to cluster center; b. Object classifier score, c. Attribute Classifier score.

These properties may be used in combination with the direct iconicity prediction score.

The score of the combination may be obtained by averaging the scores of each of the properties being combined (for instance after post-processing, such as data standardization, for example such that all properties have scores in the range of 0-1).

In another embodiment, weights for the combination are learnt with a discriminative classifier, using iconicity rankings associated with a training set of images. Any suitable supervised learning method may be used for training the classifier, such as Support Vector Machines (SVM), linear regression, Naïve Bayes, Neural Networks, logistic regression decision tress, or the like. An example method for learning weights for each of the properties to be combined is a binary SVM formulation which involves setting an arbitrary threshold that will split the labeled training set into iconic and non-iconic images. In the experiments below, this threshold was set to 1.5 (when the possible scores were 0, 1, and 2). As for the ranking SVM formulation, given training pairs of images $(x^+, x^-)$ such that $x^+$ is ranked higher than $x^-$, the aim of the learning process is to minimize the regularized ranking loss:

$$\sum_{(x^+, x^-)} \max\{0, 1 - w'(x^+ - x^-)\} + \frac{\lambda}{2} \|w\|^2 \quad (3)$$

The second term is a regularization term which helps to prevent overfitting. $\lambda$ can be selected to give more or less weight to this term. Eqn. 2 can be optimized using a gradient descent method if there are a large number of images, by taking pairs of images in turn and modifying the classifier if the relative ranking by the classifier does not agree with the ranking given by the iconicity scores.

Application to Crowdsourcinq

The iconicity score finds application in a crowdsourcing method for automatic or semi-automatic design of the visual content of a user interface for a labeling task. This is beneficial when designing HITs (Human Intelligence Tasks) for a crowdsourcing platform.

Crowdsourcing is used extensively by the computer vision community to acquire image labels: an image or a video is displayed to a worker and the worker has to provide one or multiple annotations. While in some tasks, classes may be simple to distinguish, such as car, bus, bike, plane, cat, dog, horse, cow, etc., in other tasks, fine-grained visual classification (FGVC) is desired in which images are to be annotated with labels selected from numerous categories which are semantically related and visually similar. The recognition of a car brand and make can be considered as a fine-grained task. For these tasks, experts may be able to assign labels to images without visual assistance but average annotators need a visual representation of each of the classes. While in the past, such visual representations have been chosen by experts, the present iconicity measure allows for the representative images for these interfaces to be selected automatically, or semi-automatically, where a non-expert may select the representative images with the help of the iconicity scores.

In the exemplary labeling task, an annotator is asked to assign one image to one or several class labels from a set of candidate labels, which may have been selected automatically from a larger label set, using a classifier (see, for example, application Ser. No. 14/184,936). It is desirable for the labeling to be as accurate as possible. The design of the interface has an impact on this. Since the class (or category, or label) names are often not sufficient for users to perform the annotation task, they are provided with a visual representation of that class to assist them in making their decision. This is beneficial for cases for which the names of the classes are outside the area of expertise of the average annotator, as is the case for fine-grained classification (for example, classification of birds, plants, vehicle models, etc.) The present method can be used for automatically or semi-automatically generating the visual content used in the interface, by choosing the best representative image(s) from an initially collected set of images using the iconicity score of each image. In the semi-automatic method, images from the set can be rated based on their iconicity and accompanied by a description of what makes them iconic, allowing for a manual review in which the different components of iconicity can be considered with more or less weight, depending on the particular task.

In addition to selecting representative images, iconicity scores can also be used for generating gold questions. These are questions which are used to gauge the performance of the crowdworker, as some crowdworkers may pay insufficient attention to the task or be unable to perform it. The difficulty of a multi-class classification gold question can be modified by choosing the set of classes which compose the multi-class problem. In the particular case of a visual recognition task, the images to be displayed for each class can be selected by using the iconicity measure to control the difficulty of the question since more iconic images will typically generate easier gold questions.

The crowdsourcing method can proceed as shown in FIG. 3.

At S202, for each class, a set 30 of relevant images is collected. Each image is labeled with its class.

At S204, each image of this set is scored according to an iconicity measure, as described above. This measure can be computed with the direct iconicity predictor, a combination of several other property measures, or a combination of both.

At S206, the images in the set are ranked based on their iconicity scores.

At S208, in the automatic method, for each class, the visual content is chosen, which may be the most iconic image(s) according to the ranking.

Alternatively, at S210, in a semi-automatic method, at least a sub-set of the more highly-ranked images is presented to a reviewer for a manual selection of images, where the designer of the computer interface reviews images, their rank, and optionally the scores of each property to make a final selection. At S212, the reviewer's selection is received by the system.

Optionally, at S212, one or more other images from the set are chosen for generating gold questions. The image for the gold question can be selected to have an iconicity score within a predefined range that enables a competent and diligent crowdworker to correctly identify the label, while providing sufficient difficulty such that the crowdworker does not easily recognize that it is a gold question.

At S214, a standard labeling task may be generated which includes an image to be labeled and a set of candidate labels, each candidate label being associated with the iconic image(s) for the respective class.

At S216, a gold question may be generated, which is similar to the labeling task, but here the image to be labeled is an iconic image whose class label is already known. The iconicity score of the images can be used to tailor the gold question, making it harder (by using an image with a higher iconicity score) or easier.

Figure 5:
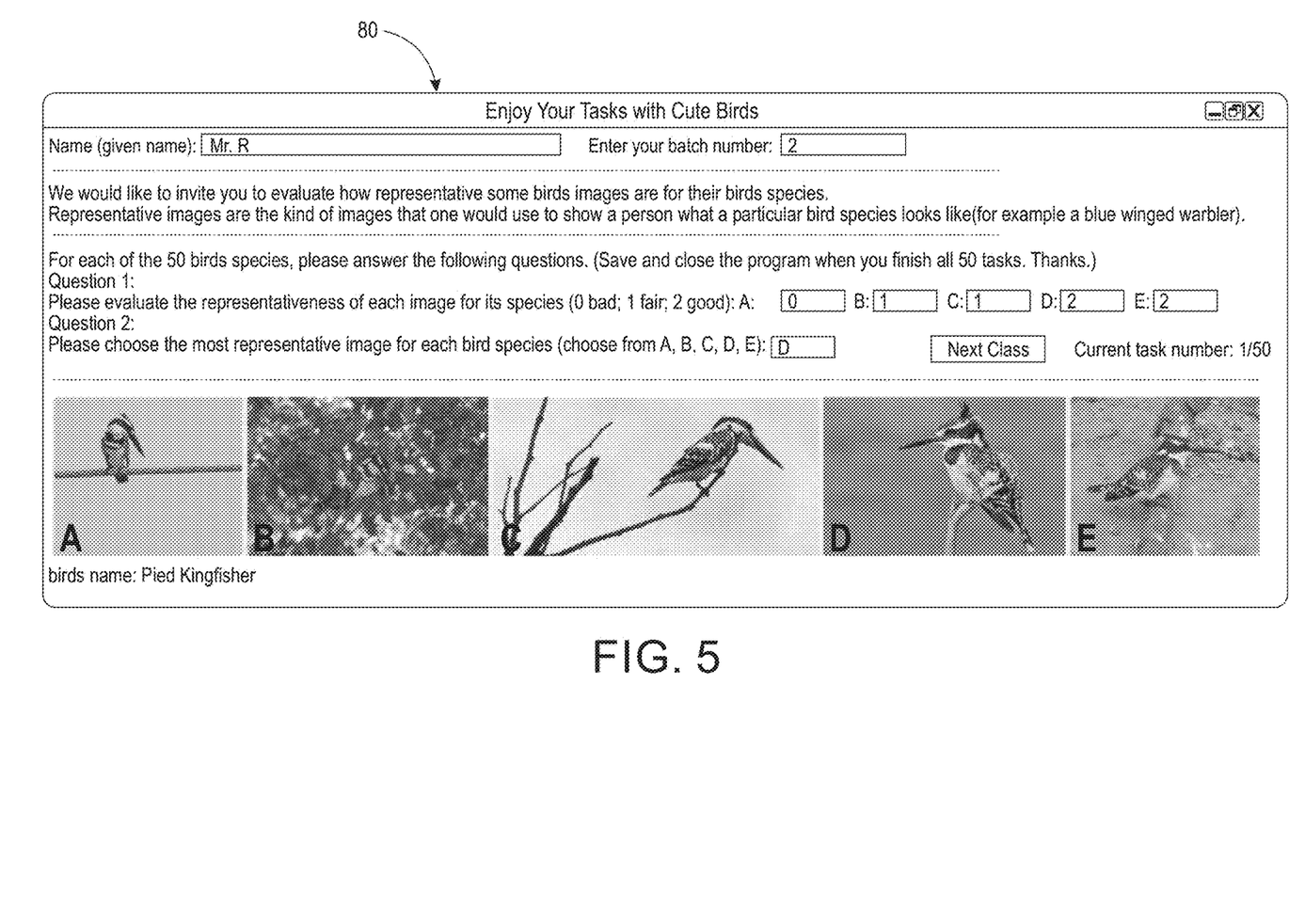
FIG. 5 illustrates a user interface for acquiring iconicity ratings.

At S218, the gold question and one or more standard labeling tasks are combined to form a human intelligence task (HIT) for display in a user interface. FIG. 5 illustrates an example user interface 80.

At S220, the HIT is output and at S222, responses are received from one or several crowdworkers and processed.

The gold question answers are used to identify responses that are likely to be from competent, diligent crowdworkers, which are then used to provide labels for the images in the standard questions.

The method ends at S224.

The method illustrated in FIGS. 2 and/or 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 70, (for example, an internal hard drive of RAM), or may be separate (for example, an external hard drive operatively connected with the computer 70), or may be separate and accessed via a digital data network such as a local area network (LAN) or the Internet (for example, as a redundant array of inexpensive of independent disks (RAID) or other network server storage that is indirectly accessed by the computer 70, via a digital network).

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the method for predicting iconicity, alone or in a crowdsourcing application. As will be appreciated, while the steps of each method may all be computer implemented, in some embodiments one or more of the steps may be at least partially performed manually.

As will be appreciated, the steps of the method(s) need not all proceed in the order illustrated and fewer, more, or different steps may be performed.

Without intending to limit the scope of the exemplary embodiment, the following examples demonstrate the applicability of the method.

EXAMPLES

An evaluation was conducted on the Caltech-UCSD-Birds-200-2011 (CUB) dataset. See, Wah, et al. "The Caltech-UCSD Birds-200-2011 Dataset, Technical Report CNS-TR-2011-001, Caltech, pp. 1-8 (2011), hereinafter, "Wah 2011". This is a fine-grained dataset that contains 11,788 images of 200 species of birds. The dataset was chosen because it contains a large number of images and classes. It also is representative of typical labeling problems, where choosing iconic images can make a substantial difference in a hybrid (human+computer vision) system. Classification on this dataset is extremely challenging, even for human beings. Advantageously also, this dataset comes with a rich set of annotations: bounding boxes locate the birds precisely in the images, all parts relevant to birds (e.g., beak, eyes, legs, etc.) are indicated as being visible or not, and image-level attribute annotations describe which visual attributes can be observed in each image.

In each experiment, the standard training/testing split of the CUB images was used. All supervised learning (e.g., computing class means, training SVM classifiers) was performed on the training set and all the results were measured on a portion of the test split for which iconicity was separately acquired in human evaluations. For validation of the model parameters, the training set was split into two halves, with training on the first half, validation on the second half, and retraining of the models on the full training set with the optimal validation parameters.

FIG. 5 illustrates a user interface 80 used to acquire iconicity ratings. Annotators rated the iconicity of images in sets of five.

Acquiring Iconicity Scores

Annotations were acquired from a set of 32 volunteers. Each participant was shown 50 sets of images corresponding to 50 bird classes. The user was asked to rate the iconicity of each image, where an iconic image was defined as "the kind of images one would use to show a person what a particular bird species looks like." No further suggestions were provided to the volunteers as to what criteria should be used in making this assessment. The volunteers rated iconicity according to three values: 0 for "bad", 1 for "fair", and 2 for "good". For each class, 5 images of the same bird species were shown (in one row, all with the same height (see, for example, the row of 5 bird images in FIG. 5). Hence, even if the participants were not acquainted with a particular bird species, showing multiple images simultaneously provided them with an opportunity to get familiarized.

The CUB dataset contains a training set of 5,994 images and a test set of 5,794 images. For the training set, iconicity annotations were collected from 20 participants, providing 4,100 iconicity annotations for the training set. In the test set, 2,995 images were annotated by a set of 12 participants. 15 images were annotated for each of the 200 species, except for two classes that have only respectively 11 and 14 images in the test set. To avoid any bias, the participants annotating the training and the testing sets were completely different.

Among the training images, 1,597 images (39.0%) are rated 2, 1,742 images (42.5%) are rated 1, and 761 images (18.6%) are rated 0. The testing set follows the same trend, with 1,161 images (38.8%) rated 2, 1,257 images (42.0%) rated 1, and the rest rated 0. This shows that the full iconicity scale was used.

Evaluation Measures

Two different evaluation measures were considered. In the first, the correlation between the indicators and iconicity (from the human annotations) was evaluated. The correlation was measured using Spearman's rank correlation (SRC) coefficient which can handle rank ties. To compute it, n scores $A_i$ and $B_i$ are converted to ranks $a_i$, $b_1$, and SRC is computed as:

$$\rho = \frac{\sum_{i=1}^{n}(a_i - \bar{a})(b_i - \bar{b})}{\sqrt{\sum_{i=1}^{n}(a_i - \bar{a})^2 \sum_{i=1}^{n}(b_i - \bar{b})^2}} \in -1, 1 \quad (4)$$

where $\bar{a}$ and $\bar{b}$ are the mean of the ranks $a_i$ and $b_i$ respectively. The sign of ρ indicates the direction and strength of association between the score sets A and B, where 1 means that the two ranks perfectly match, 0 no correlation, and −1 that they are anti-correlated.

Given a set of n test images, SRC can be computed between the image scores from each indicator and the iconicity scores (ground-truth) of the dataset. SRC can also be computed for a combination of properties. The corresponding p-values are also computed. A p-value smaller than 0.05 means the descriptors are statistically correlated with a 95% confidence level.

Second, the quality of an indicator was evaluated as a classification problem. Positive (=iconic) images were defined as those whose ground-truth label was above a threshold α and the remaining were labeled as negative. For these experiments, α=1.5 was used. The average precision (AP) for this binary classification problem is computed.

Individual Iconicity Properties

1. Class Independent Properties

Object size and location: the ground-truth bounding-box (BB) for bird location was used to derive two indicators: BB-size measures the percentage of image pixels covered by BB, and BB-dist2center computes the distance between the object center (BB center) and the image center, normalized by the length of the image diagonal. The Deformable Part Model (DPM) object detector was used for the case where the location is unknown. The DPM was trained using the BB annotations of the 200 species of birds from the training set to build a generic bird detector. Two indicators were computed using the DPM output instead of the ground-truth: DPM-size and DPM-dist2center.

Aesthetics: for the aesthetic scores, a generic model was trained with the full training set. This model was then applied to the bird images, and the score of an image is simply the SVM classifier score, referred to as the Aesthetic-Generic property. A subset of images of the AVA dataset is also annotated with semantic tags. The most relevant tag to the bird example is "animal" (2,500 images). Therefore, an animal-specific aesthetic model was also trained, which is referred to as the Aesthetic-Animal property.

Occlusion: images in the CUB dataset were annotated with the location of 15 bird body-parts: both eyes, the forehead, the crown, the bill, the nape, the throat, the breast, the back, both wings, the belly, both legs and the tail. For each part, it was known whether it is visible or not. This information was used as an occlusion indicator, where the occlusion score is simply the number of visible parts.

Memorability: a memorability predictor 48 was trained using the SUN Memorability dataset, that contains 2,222 images labeled with memorability scores. See, Isola 2011. Fisher Vector (FV) representations of the images were used. The memorability scores from the SUN dataset were used to train a linear SVM classifier. The SVM score on the test image constitutes the memorability score. The dataset contains only few images with animals (less than 10) so an animal-specific memorability model was not trained in this case.

2. Class Dependent Properties

Distance to the cluster center: as discussed above, for any new image x' from the test set, a similarity to the cluster center $(-\|x'-\mu_k\|^2)$ is computed and this score is used as an iconicity measure for class k. The FV representation, which resulted in a Cluster-FV score, was used.

Object classifier scores: one linear SVM classifier was trained per class using the labeled training set. Then the iconicity of a test image with respect to a category can be measured by computing the corresponding classifier score.

Classifiers using attributes: for the attribute classifier, the CUB dataset containing annotations for M=312 attributes, at the image level, was used. The 312 attributes describe the bird color (of the wings, the back, the forehead, etc.) and shape (of the bill, the tail, etc.) and other attributes not necessarily found in birds. In other words, each image is associated with an attribute representation in the form of a vector where each index takes binary values to indicate whether an attribute is present in this image or not. These image-level attribute annotations were used together with a distance-based classifier to compute image-to-class similarity (I2C) between an image and class C (I2C-Att-Orac). The image level attribute vectors were also used as image descriptors, and SVM classifiers were trained for various bird species, using the attribute vectors of the training set. Then the trained per-class classifier was used to predict a score for each image (SVM-Att-Orac).

A DAP model was also used to predict the score for an image in an oracle scenario and a predicted one. For the oracle scenario, the probabilities are 0 or 1, based on the image level annotation. $\epsilon=10^{-5}$ was used for probability 0 and 1-ϵ for probability 1 to avoid the overall p(a|x)=0. This indicator is referred to as DAP-Orac. For the predicted scenario, it is assumed that test images are not annotated with image-level attribute vectors, and the real attribute probabilities are predicted using attribute classifiers trained on training images (DAP-Pred). All DAP models were learnt on FV representations.

TABLE 1 gives a comparison of several of the iconicity properties on test dataset. Spearman rank correlation (SRC), corresponding p-value, and average precision (AP) are shown.

TABLE 1

| PROPERTY | SRC | p-VALUE | AP |
|---|---|---|---|
| Class-independent Properties | | | |
| BB-size | 0.304 | 3.01e−65 | 51.7 |
| DPM-size | 0.280 | 6.84e−55 | 51.6 |
| BB-dist2center | 0.097 | 9.53e−08 | 43.4 |
| DPM-dist2center | 0.069 | 1.67e−04 | 41.3 |
| Occlusion | 0.163 | 3.17e−19 | 45.2 |
| Aesthetic-Generic | 0.139 | 2.29e−14 | 46.1 |
| Aesthetic-Animal | 0.185 | 1.73e−24 | 47.4 |
| Memorability | 0.112 | 9.16e−10 | 43.7 |
| Class-dependent Properties | | | |
| Cluster-FV | 0.111 | 1.18e−09 | 43.3 |
| SVM + FV | 0.233 | 2.85e−38 | 49.1 |
| SVM-Att-Orac | 0.150 | 1.90e−16 | 48.1 |
| I2C-Att-Orac | 0.126 | 5.52e−12 | 44.1 |
| DAP-Orac | 0.113 | 5.06e−10 | 44.2 |
| DAP-Pred | 0.063 | 5.95e−04 | 42.7 |

The correlation between the different properties was evaluated. High correlations were obtained by all methods using the class information. The two most correlated methods were the SVM-FV and the Cluster-FV (correlation: 0.706), and the second highest correlation was the attribute method together with the SVM-FV, both of which rely on the same descriptors: FVs. The aesthetic and the memorability indicators have very low correlation with the other methods. Thus, is is suggested that these class-independent indicators can complement the class-based ones effectively.

Combinations and Direct Iconicity Predictor

In a first experiment, a limited set of iconicity properties (namely BB-size, Aesthetic-Animal and Cluster-FV) was used and the average computed. The results are referred to as Average Baseline set. A second experiment used an SVM classifier to learn weights for the baseline set of properties and is referred to as Learnt on Average Baseline set. The threshold for dividing the training set into iconic and non-iconic images was set at 1.5. In learning the weights, the images $x^+$ and $x^-$ of a given pair $(x^+,x^-)$ were drawn from the same batch of 5 images annotated by the same user. This helped to reduce the effects of different annotators during the learning process (e.g., that some annotators may be more inclined than others to rate images as iconic).

In third and fourth experiments, a combination of class-dependent and class-independent indicators was used. This included the object size (BB-size), image aesthetics (Aesthetic-Animal), the distance to the average descriptor (Cluster-FV), memorability score (Memorability), the number of visible parts (Occlusion), the score of a discriminative object classifier (SVM-FV), and the score of an attribute-based classifier (SVM-Att).

To make them comparable, the scores of each indicator were standardized (average 0, and standard deviation 1). Two combination methods were considered. In the first method, all scores were averaged, giving the results in Table 2 denoted as Average on Full Set. In the second method, indicator scores obtained from the training images were used to train an SVM classifier and learn weights for the different properties, as for the Baseline set. The results are shown in Table 2, denoted Learnt on Full Set.

In a fifth experiment, the direct iconicity predictor 56 was used as described above to predict iconicity labels based on Fisher Vector descriptors. For this evaluation, a binary classification approach was used as when computing the AP scores (images with a score higher than 1.5 are considered iconic=positive), and an SVM classifier was trained on images from the training set, using FVs as image descriptors and iconicity labels. Two types of descriptors were extracted at the patch level, SIFT and color, and a Fisher vector computed for each. Late fusion of the SIFT and color-based FVs was used to generate the FV vector for the image. A linear SVM was used on the FV features and its parameters learned using either a binary classification objective function or a ranking objective function. These predictors are denoted DIP-bin and DIP-rank, respectively.

In a sixth experiment, an expert selection of iconic images was mimicked using a Google image search. Keywords were used to search for the relevant visual classes and then the displayed representative image illustrated in a small box on the result page was taken as the expert selection. This first displayed image is often from Wikipedia, so it is assumed that it has been manually chosen by an expert to best represent this class. Then, the similarity (based on a FV representation) between images from the test set, and the image chosen by the Google search can be computed. This is referred to as the Distance to Google #1 indicator.

TABLE 2 shows the property or combination used to predict the image iconicity on the test set. The Spearman rank correlation measure (SRC), corresponding p-value, and average precision (AP) are shown.

TABLE 2

| PROPERTY OR COMBINATION | SRC | p-value | AP |
| --- | --- | --- | --- |
| Average of Baseline Set | 0.305 | 1.40e−65 | 53.5 |
| Learnt on Average Baseline set | 0.337 | 2.62e−80 | 54.9 |
| Average of Full Set | 0.370 | 5.02e−98 | 58.0 |
| Learnt on Full Set | 0.401 | 3.52e−116 | 60.9 |
| Direct Iconicity Predictor | 0.372 | 7.34e−88 | 60.2 |
| Distance to Google #1 | 0.158 | 2.96e−18 | 45.9 |

It can be seen that there is an improvement when the full set of measures was used, when compared with the baseline set. Averaging the results was not quite as good as learning a classifier but still quite useful. The results also suggest that a class-independent combination could be applied.

Figure 4:
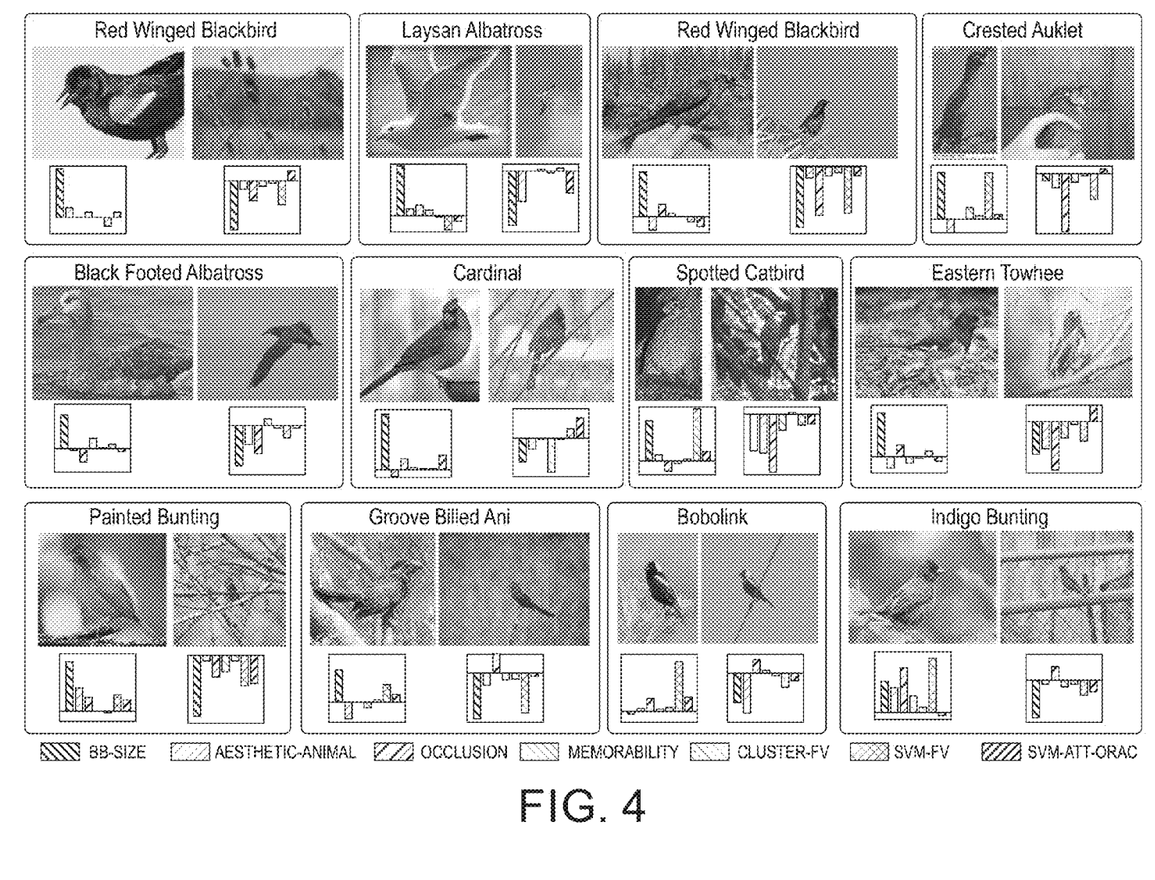
FIG. 4 illustrates a user interface displaying results of an evaluation.

For a representative set of bird species, FIG. 4 shows images with the highest predicted iconicity based on the learnt combination of indicators and images with the lowest predicted iconicity, respectively, as the left and right images of each box. Below the images, histograms display the contribution of each indicator in the decision process (learnt on the full set).

The direct prediction of iconicity using a discriminative classifier and a training set with iconicity labels was shown to perform well, and to be complementary with the combination of indicators. For example, when combining the direct iconicity predictor and a combination of other iconicity properties (DPM-size, Aesthetic-Animal, Cluster-FV, Memorability, SVM-FV, and DAP-Pred), an SRC correlation of 0.420 and an AP of 63.7% was obtained. Since the agreement between human annotators was less than 0.5, which provides an upper bound on the correlation, this is a good result.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for evaluating iconicity of an image comprising:
   receiving a plurality of test images, each test image including an object in a same selected class;
   for each of the test images:
      computing an image descriptor for the test image, the image descriptor being a multidimensional statistical representation of the test image;
      computing properties of the test image related to iconicity, including:
   a) a direct measure of iconicity which is computed based on the image descriptor, with a direct iconicity prediction model which has been learned on multidimensional descriptors of a set of training images, each training image labeled with an iconicity score,
   b) at least one class-independent property, and
   c) at least one class-dependent property; and
      computing a measure of iconicity of the test image based on the computed properties, the computing of the measure of iconicity comprising aggregating the computed properties of the test image with an aggregating function in which the computed properties are weighted with respective weights; and
   outputting information based on the computed measures of iconicity, wherein at least one of the computing of the properties and the computing the measure of iconicity of the image is performed with a processor.

2. The method of claim 1, wherein the properties include at least two class-independent properties.

3. The method of claim 1, wherein the at least one class-independent property is selected from the group consisting of:
- a geometric property of the object;
- an occlusion property of the object;
- an aesthetic property of the image;
- a memorability property of the image; and
- combinations thereof.

4. The method of claim 1, wherein the properties include the at least two class-dependent properties.

5. The method of claim 1, wherein the at least one class-dependent property is selected from the group consisting of:
- an object classifier property generated with an object classifier which has been trained to discriminate images containing objects in the selected class from images containing objects in other classes;
- an attribute-based property;
- a distance to a cluster center computed based on a set of images each including an object in the selected class; and
- combinations thereof.

6. The method of claim 1, further comprising ranking the test images in the plurality of test images based on the measure of iconicity for each of the test images.

7. The method of claim 1, further comprising identifying at least one of the plurality of test images as an iconic image, based on the measure of iconicity for each of the plurality of test images.

8. The method of claim 7, further comprising providing for displaying the at least one iconic image in a user interface.

9. The method of claim 8, wherein the user interface displays a representation of the plurality of properties which indicates the contributions of each of the properties to the measure of iconicity.

10. The method of claim 7, further comprising incorporating the iconic test image into a labeling task as a representative image of the selected class.

11. The method of claim 1, wherein the method further comprises computing a generic descriptor for the test image based on features extracted from patches of the image and computing at least one of the plurality of properties based on the test image generic descriptor.

12. The method of claim 11, wherein the generic descriptor is a Fisher vector representation.

13. The method of claim 1, further comprising learning the weights for the aggregating function using a training set of images which have been manually labeled with iconicity scores.

14. A method for evaluating iconicity of an image comprising:
receiving at least one test image which includes an object in a selected class;
for each of the at least one test images:
computing a plurality of properties related to iconicity, including at least two of:
a) a direct measure of iconicity computed with a direct iconicity prediction model which has been learned on a set of training images, each training image labeled with an iconicity score,
b) a class-independent property, and
c) a class-dependent property; and
computing a measure of iconicity of the test image based on the plurality of computed properties, wherein the computing of the measure of iconicity comprises generating a property-based representation of the computed properties and classifying the property-based representation with a classifier trained on property-based representations of training images that are each labeled with a measure of iconicity,
wherein at least one of the computing of the plurality of properties and the computing the measure of iconicity of the image is performed with a processor.

15. The method of claim 14, wherein the method further comprises outputting information based on the computed measure of iconicity.

16. A system for evaluating iconicity of an image, comprising:
memory which stores:
a descriptor generator for generating an image descriptor for an input test image, the image descriptor being a multidimensional statistical representation of the test image;
components for computing a plurality of properties of the input test image, the properties including:
a direct measure of iconicity computed with a direct iconicity prediction model which has been learned on image descriptors for a set of training images, each training image labeled with an iconicity score, and
at least one of:
at least one class-independent property, given a selected class for the image, and
at least one class-dependent property; and
an aggregating component for computing a measure of iconicity of the test image based on the plurality of computed properties; and
a processor which implements the descriptor generator and the components for computing the plurality of properties and the aggregating component.

* * * * *